US011551709B2

(12) United States Patent
Simko et al.

(10) Patent No.: US 11,551,709 B2
(45) Date of Patent: *Jan. 10, 2023

(54) END OF QUERY DETECTION

(71) Applicant: Google LLC, Mountain View, CA (US)

(72) Inventors: Gabor Simko, Santa Clara, CA (US); Maria Carolina Parada San Martin, Palo Alto, CA (US); Sean Matthew Shannon, Mountain View, CA (US)

(73) Assignee: Google LLC, Mountain View, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 16/778,222

(22) Filed: Jan. 31, 2020

(65) Prior Publication Data

US 2020/0168242 A1 May 28, 2020

Related U.S. Application Data

(63) Continuation of application No. 16/001,140, filed on Jun. 6, 2018, now Pat. No. 10,593,352.

(Continued)

(51) Int. Cl.
*G10L 25/78* (2013.01)
*G10L 15/22* (2006.01)
(Continued)

(52) U.S. Cl.
CPC ............ *G10L 25/78* (2013.01); *G10L 15/065* (2013.01); *G10L 15/18* (2013.01); *G10L 15/187* (2013.01);
(Continued)

(58) Field of Classification Search
CPC ..... G10L 15/065; G10L 15/18; G10L 15/187; G10L 15/22; G10L 2025/783; G10L 25/78; G10L 25/87; G10L 25/03; G10L 25/30

See application file for complete search history.

(56) References Cited

U.S. PATENT DOCUMENTS 4,713,777 A 12/1987 Klovstad et al.
4,980,918 A 12/1990 Bahl et al.
(Continued)

FOREIGN PATENT DOCUMENTS

JP H01219893 A 9/1989
JP H08115093 A 5/1996
(Continued)

OTHER PUBLICATIONS

'developer.amazon.com' [online] "Alexa Scientists Address Challenges of End-Pointing," Roland Maas, Apr. 10, 2018 [retrieved on May 30, 2018] Retrieved from Internet: URL<https://developer.amazon.com/blogs/alexa/post/bb1909e9-aa65-4051-9316-eba9dd3bf459/alexa-scientists-address-challenges-of-end-pointing> 7 pages.
(Continued)

*Primary Examiner* — Huyen X Vo
(74) *Attorney, Agent, or Firm* — Honigman LLP; Brett A. Krueger; Grant Griffith

(57) ABSTRACT

Methods, systems, and apparatus, including computer programs encoded on a computer storage medium, for detecting an end of a query are disclosed. In one aspect, a method includes the actions of receiving audio data that corresponds to an utterance spoken by a user. The actions further include applying, to the audio data, an end of query model. The actions further include determining the confidence score that reflects a likelihood that the utterance is a complete utterance. The actions further include comparing the confidence score that reflects the likelihood that the utterance is a complete utterance to a confidence score threshold. The actions further include determining whether the utterance is likely complete or likely incomplete. The actions further include providing, for output, an instruction to (i) maintain a microphone that is receiving the utterance in an active state
(Continued)

or (ii) deactivate the microphone that is receiving the utterance.

20 Claims, 7 Drawing Sheets

Related U.S. Application Data

(60) Provisional application No. 62/515,771, filed on Jun. 6, 2017.

(51) Int. Cl.
  *G10L 15/187* (2013.01)
  *G10L 15/065* (2013.01)
  *G10L 15/18* (2013.01)

(52) U.S. Cl.
  CPC ........ *G10L 15/22* (2013.01); *G10L 2025/783* (2013.01)

(56) References Cited

U.S. PATENT DOCUMENTS

| | | |
|---|---|---|
| 5,479,563 A | 12/1995 | Yamaguchi |
| 5,940,794 A | 8/1999 | Abe |
| 6,018,708 A | 1/2000 | Dahan et al. |
| 6,029,130 A | 2/2000 | Ariyoshi |
| 6,321,197 B1 | 11/2001 | Kushner et al. |
| 6,324,509 B1 | 11/2001 | Bi et al. |
| 6,453,292 B2 | 9/2002 | Ramaswamy et al. |
| 6,771,887 B1 | 8/2004 | Okawa et al. |
| 6,810,375 B1 | 10/2004 | Ejerhed |
| 7,035,807 B1 | 4/2006 | Brittain et al. |
| 7,136,806 B2 | 11/2006 | Miyahira et al. |
| 7,177,810 B2 | 2/2007 | Shriberg et al. |
| 7,277,853 B1 | 10/2007 | Bou-Ghazale et al. |
| 7,610,199 B2 | 10/2009 | Abrash et al. |
| 7,665,024 B1 | 2/2010 | Kondziela |
| 7,991,614 B2 | 8/2011 | Washio et al. |
| 8,000,966 B2 | 8/2011 | Mori et al. |
| 8,099,280 B2 | 1/2012 | Kuboyama et al. |
| 8,165,880 B2 | 4/2012 | Hetherington et al. |
| 8,170,875 B2 | 5/2012 | Hetherington et al. |
| 8,175,876 B2 | 5/2012 | Bou-Ghazale et al. |
| 8,494,857 B2 | 7/2013 | Pakhomov |
| 8,554,564 B2 | 10/2013 | Hetherington et al. |
| 8,600,746 B1 | 12/2013 | Lei et al. |
| 8,719,015 B2 | 5/2014 | Jang et al. |
| 8,762,150 B2 | 6/2014 | Edgington et al. |
| 8,775,191 B1 | 7/2014 | Sharifi et al. |
| 8,843,369 B1 | 9/2014 | Sharifi |
| 9,009,054 B2 | 4/2015 | Liu et al. |
| 9,311,932 B2 | 4/2016 | Carter |
| 9,437,186 B1 | 9/2016 | Liu et al. |
| 2001/0034601 A1 | 10/2001 | Chujo et al. |
| 2001/0056344 A1 | 12/2001 | Ramaswamy et al. |
| 2005/0038652 A1 | 2/2005 | Dobler |
| 2005/0108011 A1 | 5/2005 | Keough et al. |
| 2005/0171768 A1 | 8/2005 | Gierach |
| 2006/0149558 A1 | 7/2006 | Kahn et al. |
| 2006/0200350 A1 | 9/2006 | Attwater et al. |
| 2006/0235688 A1 | 10/2006 | Bicego et al. |
| 2006/0287859 A1 | 12/2006 | Hetherington et al. |
| 2007/0016426 A1 | 1/2007 | Hershey et al. |
| 2007/0100626 A1 | 5/2007 | Miller et al. |
| 2007/0143110 A1 | 6/2007 | Acero et al. |
| 2007/0168890 A1 | 7/2007 | Zhao et al. |
| 2007/0201639 A1 | 8/2007 | Park et al. |
| 2007/0225982 A1* | 9/2007 | Washio ............... G10L 15/22 704/E15.04 |
| 2008/0235019 A1 | 9/2008 | Witzman |
| 2008/0294433 A1 | 11/2008 | Yeung et al. |
| 2009/0063150 A1 | 3/2009 | Nasukawa et al. |
| 2009/0076817 A1 | 3/2009 | Jeon et al. |
| 2009/0149166 A1 | 6/2009 | Habib et al. |
| 2010/0017209 A1 | 1/2010 | Yu et al. |
| 2010/0076761 A1 | 3/2010 | Juergen et al. |
| 2010/0131279 A1 | 5/2010 | Pilz |
| 2010/0174533 A1 | 7/2010 | Pakhomov |
| 2010/0280827 A1 | 11/2010 | Mukerjee et al. |
| 2010/0292989 A1 | 11/2010 | Kitade et al. |
| 2011/0105859 A1 | 5/2011 | Popovic et al. |
| 2011/0106531 A1 | 5/2011 | Liu et al. |
| 2011/0153309 A1 | 6/2011 | Kim et al. |
| 2011/0264447 A1 | 10/2011 | Visser et al. |
| 2012/0089392 A1 | 4/2012 | Larco et al. |
| 2012/0265528 A1 | 10/2012 | Gruber et al. |
| 2013/0124646 A1 | 5/2013 | Kraft et al. |
| 2014/0012573 A1 | 1/2014 | Hung et al. |
| 2014/0156268 A1 | 6/2014 | Arizmendi et al. |
| 2014/0337370 A1 | 11/2014 | Aravamudan et al. |
| 2015/0106088 A1 | 4/2015 | Jarvinen |
| 2015/0199966 A1 | 7/2015 | Paulik et al. |
| 2015/0206544 A1 | 7/2015 | Carter |
| 2015/0310879 A1 | 10/2015 | Buchanan et al. |
| 2015/0312246 A1 | 10/2015 | Mattsson et al. |
| 2015/0348538 A1 | 12/2015 | Donaldson |
| 2015/0371665 A1 | 12/2015 | Naik et al. |
| 2016/0063992 A1 | 3/2016 | Selfridge |
| 2016/0351196 A1 | 12/2016 | Fanty |
| 2016/0379632 A1* | 12/2016 | Hoffmeister .......... G10L 15/183 704/253 |
| 2017/0354363 A1 | 12/2017 | Quatieri et al. |

FOREIGN PATENT DOCUMENTS

| | | |
|---|---|---|
| JP | H10254475 A | 9/1998 |
| JP | 2001219893 A | 8/2001 |
| JP | 2005017932 A | 1/2005 |
| JP | 2008508564 A | 3/2008 |
| JP | 2008115093 A | 5/2008 |
| JP | 4433704 B2 | 3/2010 |
| JP | 2010254475 A | 11/2010 |
| JP | 2014134675 A | 7/2014 |
| WO | 2001086633 A1 | 11/2001 |
| WO | 2011151502 A1 | 12/2011 |
| WO | 2013053798 A1 | 4/2013 |
| WO | 2015073071 A1 | 5/2015 |

OTHER PUBLICATIONS

Ferrer et al., "A Prosody-Based Approach to End-of-Utterance Detection that does not require Speech Recognition," IEEE International Conference on Acoustics, Speech, and Signal Processing, 2003, 1:1-608-1-611.

Ferrer et al., "Is the Speaker done yet? Faster and more accurate End-of-Utterance detection using Prosody," Interspeech, ISCA, (2002), 2061-2064.

Gotoh et al., "Sentence Boundary Detection in Broadcast Speech Transcripts," in Proc. of ISCA Workshop: Automatic Speech Recognition: Challenges for the new Millennium ASR-2000, Sep. 2000, 8 pages.

Gravano et al. "Turn-taking cues in task-oriented dialogue," Computer and Language, Elseview, London, GB, 25(3), Jul. 2011, 34 pages.

Liu et al. "Accurate Endpointing with Expected Pause Duration," Sixteenth Annual Conference of the International Speech Communication Association, Sep. 2015, 5 pages.

Liu et al., "Comparing and Combining Generative and Posterior Probability Models: Some Advances in Sentence Boundary Detection in Speech," Proc. EMNLP, 2004, Jan. 2004, 8 pages.

Maas et al. "Anchored Speech Detection," Interspeech, Sep. 2016, 5 pages.

Maas et al. "Combining Acoustic Embeddings and Decoding Features for End-of-Utterance Detection in Real-Time Far-Field Speech Recognition Systems," Amazon, Mar. 16, 2018, [retrieved on May 30, 2018] Retrieved from Internet: URL< https://m.media-amazon.com/images/G/01/amazon.jobs/Endpointing2p0_ V20180316._CB1521742036_.pdf> 5 pages.

(56) References Cited

OTHER PUBLICATIONS

Maas et al. "Domain-Specific Utterance End-Point Detection for Speech Recognition," Proceedings ofInterspeech, Aug. 2017, 5 pages.
Raux et al. "Optimizing endpointing thresholds using dialogue features in a spoken dialogue system," Proceedings of the 9th SIGDIAL Workshop on Discourse and Dialogue, Jan. 1, 2008, 10 pages.
Yoshida. "Automatic utterance segmentation in spontaneous speech, Master thesis," Massachusetts institute of technology, Sep. 22, 2002, 80 pages.
Arsikere et al. "Computationally-efficient endpointing features for natural spoken interaction with personal-assistant systems," IEEE international Conference on Acoustics, Speech and Signal Processing, May 4, 2014, 5 pages.
PCT International Search Report and Written Opinion issued in International Application No. PCT/US2018/036188, dated Aug. 20, 2018, 17 pages.
Shannon et al. "Improved End-of-Query Detection for Streaming Speech Recognition," Interspeech, Aug. 2017, 5 pages.

* cited by examiner

END OF QUERY DETECTION

CROSS REFERENCE TO RELATED APPLICATION

This U.S. patent application is a Continuation of, and claims priority under 35 U.S.C. § 120 from, U.S. patent application Ser. No. 16/001,140, filed on Jun. 6, 2018, which claims priority under 35 U.S.C. § 119(e) to U.S. Provisional Application 62/515,771, filed on Jun. 6, 2017. The disclosures of these prior applications are considered part of the disclosure of this application and are hereby incorporated by reference in their entireties.

TECHNICAL FIELD

This disclosure relates to natural language processing.

BACKGROUND

Natural language processing relates to the interactions between computers and human natural languages. In particular, natural language processing focuses of how to program computers to process varying amounts of natural language data. Natural language processing may involve speech recognition, natural language understanding, and natural language generation.

SUMMARY

Natural language processing systems typically use endpointers to determine when a user has started and finished speaking. Once demarcated, the portion of the audio representing the user's speech is transmitted to another component of the system for further processing, or other components can be activated or powered on for additional processing. Some traditional endpointers evaluate the duration of pauses between words in determining when an utterance begins or ends. For instance, if a user says "what is <long pause> for dinner," a traditional endpointer may segment the voice input at the long pause, and may instruct the natural language processing system to attempt to process the incomplete phrase "what is," instead of the complete phrase "what is for dinner." If an endpointer designates an incorrect beginning or ending point for a voice input, the result of processing the voice input using the natural language processing system may be inaccurate or undesirable. An inaccurately endpointed utterance may cause the system to unnecessarily activate another component of the system to further process the audio data. This unnecessary activation may waste computing resources and/or battery power because the user may end up repeating the same utterance in hopes of the system properly demarcating the user's speech and activating the proper components or performing the proper additional processing.

Some natural language processing systems may include a speech decoder. The speech decoder may be configured to process, using a language model, audio data that corresponds to a user's utterance to generate a transcription of the audio data and determine when the user is likely finished speaking. A remote server may implement the speech decoder which may require a device that receives the utterance to transmit, over a network, portions of the audio data as the user speaks the utterance and the receiving device detects the utterance using a microphone.

The speed of the network may dictate the manner in which the receiving device is able to transmit the audio data over the network to the remote server. A fast network allows the receiving device to transmit the audio data in small packets that may each include about one hundred milliseconds of audio data at a frequency of about one packet every one hundred milliseconds. A slow network may prevent the receiving device from transmitting audio data at a similar frequency. When transmitting the audio data over a slow network, the receiving device may transmit audio data in larger packets that may each include eight hundred milliseconds of audio data at a frequency of about one packet every eight hundred milliseconds.

The efficiency of the speech decoder may degrade in instances where the speech decoder receives audio in larger packets. In this case, the speech decoder may be unable to determine in a timely fashion whether the user has likely finished speaking or not. In doing so, the microphone of the device detecting the utterance may remain open and detect sounds not intended for the device. Execution of the action specified by the utterance may also be delayed. If the user said to call mom, then there may be a delay in the phone initiating the call because the speech decoder was slow to determine when the user likely stopped speaking which caused the phone to be slow in performing the action specified by the utterance. The phone may also detect additional audio which may cause the action performed by the phone or the server to be an action different than what the user intended, which may result in wastage of computational resources in interpreting and acting on the additional audio detected.

To correct the above identified problems, the natural language processing system may include an end of query detector that uses machine learning and neural networks to quickly determine whether a user has likely stopped speaking. The end of query detector may apply a model that is configured to determine whether the received audio data likely corresponds to a complete utterance or an incomplete utterance. The model may be trained using labeled training data that includes complete utterances and incomplete utterances. The model may use various acoustic speech characteristics that include pitch, loudness, intonation, sharpness, articulation, roughness, instability, and speech rate to determine whether the user has likely finished speaking. The model may also take into account other acoustic cues which may occur during pauses in use speech to determine whether the user has likely finished speaking.

The end of query detector is able to determine whether the received audio data likely corresponds to a complete utterance or an incomplete utterance faster than the speech decoder, in particular when the remote server receives the audio data in large packets at a slow frequency. Therefore, the remote server may not delay in determining when a user has likely finished speaking and can transmit an instruction to deactivate the microphone without waiting for the speech decoder to determine that the user has likely finished speaking. As such, computational resources and power can be conserved.

According to an innovative aspect of the subject matter described in this application, a method for detecting an end of a query includes the actions of receiving audio data that corresponds to an utterance spoken by a user, applying, to the audio data, an end of query model that (i) is configured to determine a confidence score that reflects a likelihood that the utterance is a complete utterance and (ii) was trained using audio data from complete utterances and from incomplete utterances; based on applying the end of query model that (i) is configured to determine the confidence score that reflects the likelihood that the utterance is a complete utterance and (ii) was trained using the audio data from the complete utterances and from the incomplete utterances, determining the confidence score that reflects a likelihood that the utterance is a complete utterance; comparing the confidence score that reflects the likelihood that the utterance is a complete utterance to a confidence score threshold; based on comparing the confidence score that reflects the likelihood that the utterance is a complete utterance to the confidence score threshold, determining whether the utterance is likely complete or likely incomplete; and based on determining whether the utterance is likely complete or likely incomplete, providing, for output, an instruction to (i) maintain a microphone that is receiving the utterance in an active state or (ii) deactivate the microphone that is receiving the utterance.

These and other implementations can each optionally include one or more of the following features. The actions further include, based on comparing the confidence score that reflects the likelihood that the utterance is a complete utterance to the confidence score threshold, determining that the confidence score satisfies the confidence score threshold. The action of determining whether the utterance is likely complete or likely incomplete includes determining the utterance is likely complete based on determining that the confidence score satisfies the confidence score threshold. The action of providing, for output, an instruction to (i) maintain a microphone that is receiving the utterance in an active state or (ii) deactivate the microphone that is receiving the utterance includes providing, for output, the instruction to deactivate the microphone that is receiving the utterance. The actions further include generating a transcription of the audio data, and providing, for output, the transcription. The actions further include receiving, from a user, data confirming that the user finished speaking; and based on receiving the data confirming that the user finished speaking, updating the end of query model.

The actions further include, based on comparing the confidence score that reflects the likelihood that the utterance is a complete utterance to the confidence score threshold, determining that the confidence score does not satisfy the confidence score threshold. The action of determining whether the utterance is likely complete or likely incomplete includes determining the utterance is likely incomplete based on determining that the confidence score does not satisfy the confidence score threshold. The action of providing, for output, an instruction to (i) maintain a microphone that is receiving the utterance in an active state or (ii) deactivate the microphone that is receiving the utterance includes providing, for output, the instruction to maintain the microphone in an active state. The actions further include receiving audio data of multiple complete utterances and multiple incomplete utterances, and training, using machine learning, the end of query model using the audio data of the multiple complete utterances and the multiple incomplete utterances. The end of query model is configured to determine the confidence score that reflects the likelihood that the utterance is a complete utterance based on acoustic speech characteristics of the utterance that include pitch, loudness, intonation, sharpness, articulation, roughness, instability, and speech rate.

The actions further include determining that a speech decoder that is configured to generate a transcription of the audio data and that is configured to determine whether the utterance is likely complete or likely incomplete has not determined whether the utterance is likely complete or likely incomplete. The action of determining whether the utterance is likely complete or likely incomplete is based on only comparing the confidence score that reflects the likelihood that the utterance is a complete utterance to the confidence score threshold. The speech decoder uses a language model to determine whether the utterance is likely complete or likely incomplete. The actions further include determining that a speech decoder that is configured to generate a transcription of the audio data and that is configured to determine whether the utterance is likely complete or likely incomplete has determined whether the utterance is likely complete or likely incomplete. The action of determining whether the utterance is likely complete or likely incomplete is based on (i) comparing the confidence score that reflects the likelihood that the utterance is a complete utterance to the confidence score threshold and (ii) the speech decoder determining whether the utterance is likely complete or likely incomplete.

Other implementations of this aspect include corresponding systems, apparatus, and computer programs comprising instructions which may be recorded on one or more computer storage devices, each configured to perform the operations of the methods.

The subject matter described in this application may have one or more of the following advantages.

A user may use the voice input capabilities of a computing device and speak at a pace that is comfortable for the user. This may increase the utility of the computing device for users, in particular for users with speech disorders or impediments. An utterance may be endpointed at the intended end of the utterance, leading to more accurate or desirable natural language processing outputs, and to faster processing by the natural language processing system. This can reduce the use of computational resources and can conserve power. Moreover, closing of the microphone at a more suitable point can further reduce the use of computational resources and conserve power, since the microphone does not need to be activated, and the use of computational resources in interpreting and performing tasks based on additional audio detected by the microphone can be avoided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
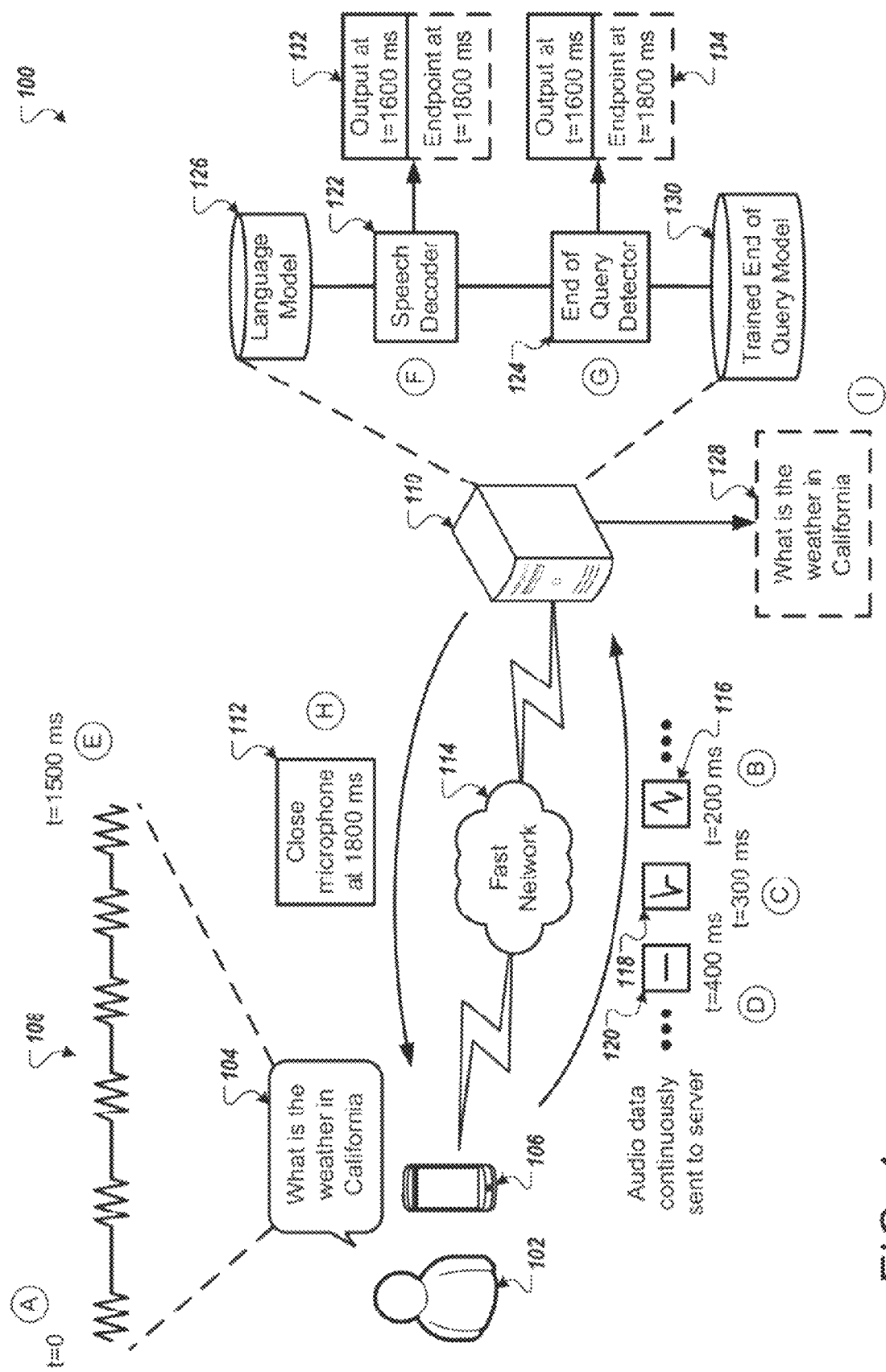
FIGS. 1 and 2 illustrate example systems for detecting an end of an utterance.

FIG. 1 illustrates an example system 100 for detecting an end of an utterance. Briefly, and as described in more detail below, the user 102 speaks the utterance 104. The microphone of the computing device 106 detects the utterance 104. As the user 102 is speaking, the computing device 106 transmits portions of the audio data 108 of the utterance 108 to the server 110. As the server 110 receives the portions of the audio data 108, the server 110 processes the portions of the audio data 108 and determines when the user 102 is likely finished speaking. The server 110 transmits an instruction 112 to the computing device 106 to deactivate the microphone of the computing device 106.

In stage A and at time zero, the user 102 begins speaking the utterance 104. For example, the user may begin the utterance 104 by speaking "what." The computing device 106 detects the utterance 104 through a microphone. The computing device 106 may be any type of computing device that is capable of detecting sound. For example, the computing device 106 may be a phone, tablet, smart watch, smart speaker, laptop computer, desktop computer, or any other similar type of computing device.

The computing device 106 receives and processes the utterance 104 as the user 102 begins speaking. The computing device 106 samples the audio detected by the microphone and converts the analog signal to a digital signal using an analog to digital converter. The computing device 106 may store the digitized audio in a buffer for further processing by the computing device 106 or transmission of the digitized audio to the server 106.

In the example illustrated in FIG. 1, the computing device 106 and the server 110 communicate through a fast network 114. The fast network 114 allows the computing device 106 to transmit smaller portions of the audio data 108 at a greater frequency than if the computing device 106 and the server 110 were communicating through a slower network. An example with a slower network will be described below in FIG. 2

At stage B, the computing device 106 begins transmitting portions of the audio data 108 to the server 110. For example, at time equals two hundred milliseconds, the computing device 106 transmits the portion 116 of the audio data 108. The portion 116 may correspond to the first hundred milliseconds of the audio data 108 or an initial portion of "what." Because the network 114 is fast enough, the computing device 106 may continue to transmit additional portions of the audio data 108 as short intervals. For example, at stage C and at time equals three hundred milliseconds, the computing device 106 transmits portion 118 of the audio data 108. The portion 118 of the audio data 108 may correspond to the second hundred milliseconds of the audio data 108 or a remaining portion of "what." At stage D and at time equals four hundred milliseconds, the computing device 106 transmits portion 120 of the audio data 108 to the server 110. The portion 120 of the audio data 108 may correspond to the third hundred milliseconds of the audio data 108 or the period of silence between "what" and "is."

The server 110 receives the portions 116, 118, and 120 of the audio data 108 and processes them using the speech decoder 122 and the end of query detector 124. The speech decoder 122 may be configured to identify the different phonemes that are included in the portions of the audio data 108. The portions 116, 118, and 120 of the audio data 108 may not correspond to different phonemes of the utterance 104. For example, the portion 116 of the audio data 108 may include the "wh" sound and some of the "a" sound. The portion 118 of the audio data 108 may include the remaining portion of the "a" sound" and the "t" sound. The speech decoder 122 processes the portions 116 and 118 and identifies the phonemes for the "wh" sound, the "a" sound, and the "t" sound. The speech decoder 122 may process the portion 120 and identify a silence phoneme. In some implementations, a different processing engine of the server identifies the phonemes based on the portions 116, 118, and 120 of the audio data 108 and provides the phonemes and timing data to the speech decoder 122. The timing data may include the amount of time that the user 102 used to speak each phoneme. In some implementations, the computing device 106 identifies the phonemes and each of the portions 116, 118, and 120 correspond to a different phoneme. In this instance, each of the portions 116, 118, and 120 may include timing data that specifies the amount of time that the user 102 used to speak each phoneme.

The speech decoder 122 processes the phonemes of the audio data 108 and generates a transcription 128 of the audio data 108. In some implementations, the speech decoder 122 uses a language model 126 to generate the transcription 128. The speech decoder 122 may also use the language model 126 to determine when the user 102 has stopped speaking. For example, by applying the language model 126 to the initial phonemes of the audio data 108, the speech decoder 122 may determine that the user has likely not finished speaking after "what is" because "what is" is likely an incomplete utterance.

The speech decoder 122 processes portions 116, 118, and 120 of the audio data 108 as the speech decoder 122 receives the portions 116, 118, and 120. The speech decoder 122 may determine that the user 102 likely spoke "what is" while receiving portions of the audio data 108 that correspond to "California."

The end of query detector 124 also receives the portions 116, 118, and 120 of the audio data 108 and applies them to the trained end of query model 130. The end of query detector 124 processes the portions 116, 118, and 120 of the audio data 108 as the server 110 receives the portions. The end of query detector 124 generates a confidence score that reflects a likelihood that the user 102 has finished speaking (i.e. that the utterance is complete). In other words, the confidence score reflects a probability that the utterance 104 is complete. The end of query detector 124 compares the confidence score to a threshold score. If the confidence score satisfies a threshold, then the end of query detector 124 determines that the user 102 has likely finished speaking and the utterance is likely complete.

As an example, the end of query detector 124 processes the portions 116, 118, and 120 of the audio data 108 that correspond to the user 102 speaking "what" followed by the silence between "what" and "is." The end of query detector 124 receives the first portion 116 and processes the portion 116 using the trained end of query model 130. The end of query detector 124 generates a confidence score of 0.01 and compares the confidence score to a confidence threshold of 0.8. The end of query detector 124 determines that after the portion 116, the utterance is likely incomplete and the user 102 has not finished speaking.

The end of query detector 124 receives the portion 118 and processes the portion 118 using the trained end of query model 130. The end of query detector 124 generates a confidence score of 0.01 and compares the confidence score to a confidence threshold of 0.8. The end of query detector 124 determines that after the portions 116 and 118, the utterance is likely incomplete and the user 102 has not finished speaking.

The end of query detector 124 receives the portion 120 and processes the portion 120 using the trained end of query model 130. The end of query detector 124 generates a confidence score of 0.2 and compares the confidence score to a confidence threshold of 0.8. The end of query detector 124 determines that after the portions 116, 118, and 120, the utterance is likely incomplete and the user 102 has not finished speaking. In this instance, the confidence score may be higher because the portion 120 includes silence.

In stage E and at time equals fifteen hundred seconds, the user finishes speaking the utterance 104. At this point, the user 102 may not have provided any indication to the computing device 106 that the user 102 has finished speaking. Accordingly, the server 110 does not have any information from the user 102 indicating that the user 102 has finished speaking. The microphone of the computing device 106 remains active and may receive and process any additional sounds.

Soon after the user finishes speaking, the computing device 106 transmits, to the server 110, the last portion of the audio data 108 that includes the user's speech. Following the last portion of the audio data 108 that includes the user's speech, the computing device 106 transmits portions of the audio data that indicate silence, similar to the portion 120. As the server 110 continues to receive portions of the audio data, the speech decoder 122 and the end of query detector 124 continue to process the portions of the audio data. The speech decoder 122 analyzes the phonemes and uses a language model to generate the transcription 128 and determine when the user has likely finished speaking. The end of query detector 124 applies the trained end of query model 130 to the portions of the audio data to determine when the user has likely finished speaking.

At stage F and at time equals sixteen hundred seconds, the speech decoder 122 determines that the user 102 has likely finished speaking. The speech decoder 122 generates the transcription 128 and an output 132 for the computing device 106 to endpoint the user's utterance 104 at time equals eighteen hundred milliseconds. The speech decoder 122 may be configured to add three hundred milliseconds to the point where the user 102 has likely finished speaking in case the user 102 actually hasn't finished speaking. If the user 102 begins speaking again, then the process of analyzing the portions of the audio data by the speech decoder 122 continues.

At stage G and at time equals sixteen hundred seconds, the end of query detector 124 determines that the user 102 has likely finished speaking. The end of query detector 124 generates an output 134 for the computing device 106 to endpoint the user's utterance 104 at time equals eighteen hundred milliseconds. The end of query detector 124 may be configured to add three hundred milliseconds to the point where the user 102 has likely finished speaking in case the user 102 actually hasn't finished speaking. If the user 102 begins speaking again, then the process of analyzing the portions of the audio data by the end of query detector 124 continues.

Because the network 114 was a fast network, the speech decoder 122 and the end of query detector 124 determined, at approximately the same time, that the user has likely finished speaking and that the utterance 104 should be endpointed at time equals eighteen hundred milliseconds. By endpointing the utterance 104, the server 110 determines a point in time at which the user is likely finished speaking. The server does not process additional audio as user speech after the endpoint.

At stage H, the server 110 transmits an instruction 112 to the computing device 106 to deactivate the microphone at time equals eighteen hundred milliseconds. The computing device 106 receives the instruction 112 and deactivates the microphone at the instructed time.

At stage I, the server 110 outputs the transcription 128 of the utterance 104. In some implementations, the server 110 may transmit the transcription 128 to the computing device 106. In this instance, the computing device 106 may display the transcription on the 128 on the display of the computing device 106. In some implementations, the server 110 may perform an action based on the transcription 128 such as initiate a phone call, send a message, open an application, initiate a search query, or any other similar action.

Figure 2:
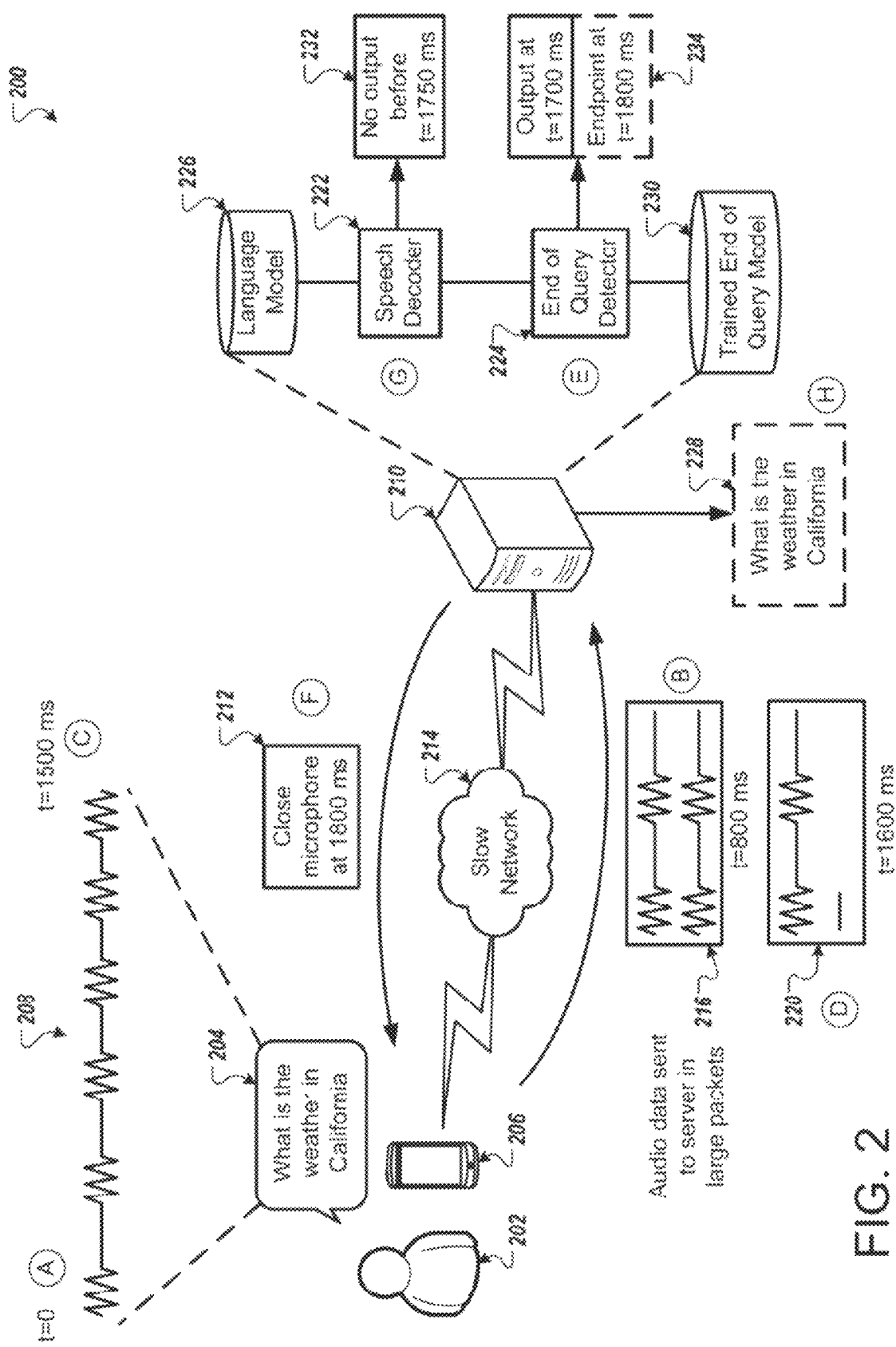

FIG. 2 illustrates an example system 200 for detecting an end of an utterance. Briefly, and as described in more detail below, the user 202 speaks the utterance 204. The microphone of the computing device 206 detects the utterance 204. As the user 202 is speaking, the computing device 206 in unable to continuously transmit small portions of the audio data 208 because of the slow network 214 connecting the computing device 206 with the server 210. Instead, the computing device 206 transmits larger packets 216 and 220 of the audio data 208 at less frequent intervals. As the server 210 receives the packets 216 and 220 of the audio data 208, the server 210 processes the packets 216 and 220 of the audio data 208 and determines when the user 202 is likely finished speaking. The server 210 transmits an instruction 212 to the computing device 206 to deactivate the microphone of the computing device 206.

In stage A and at time zero, the user 202 begins speaking the utterance 204. For example, the user may begin the utterance 204 by speaking "what." The computing device 206 detects the utterance 204 through a microphone. The computing device 206 may be similar to computing device 106 and may be any type of computing device that is capable of detecting sound. For example, the computing device 206 may be a phone, tablet, smart watch, smart speaker, laptop computer, desktop computer, or any other similar type of computing device.

The computing device 206 receives and processes the utterance 204 as the user 202 begins speaking. The computing device 206 samples the audio detected by the microphone and converts the analog signal to a digital signal using an analog to digital converter. The computing device 206 may store the digitized audio in a buffer for further processing by the computing device 206 or transmission of the digitized audio to the server 206.

In the example illustrated in FIG. 2, the computing device 206 and the server 210 communicate through a slow network 214. The slow network 214 prevents the computing device 206 from transmitting portions of the audio data 208 at a frequency similar to the frequency that computing device 106 transmitted portions 116, 118, and 120 in FIG. 1. Instead, the computing device 206 is only able to transmit larger packets 216 and 220 to the server 210 at a lower frequency that in FIG. 1.

At stage B, the computing device 206 transmits the first packet 216 of the audio data 208 to the server. For example, at time equals eight hundred milliseconds, the computing device 206 transmits the packet 216 of the audio data 208. The packet 216 may correspond to the first eight hundred milliseconds of the audio data 208 or the words "what is the weather." Because the network 214 is too slow, the computing device 206 is unable to transmit any additional audio packets until stage D.

Before the computing device 206 sends the next packet 220 of audio data 208 to the server 210 and at stage C (e.g., time equals fifteen hundred milliseconds), the user 202 finishes speaking. Similar to the example in FIG. 1, the user 202 may not have provided any indication to the computing device 206 that the user 202 has finished speaking. Accordingly, the server 210 does not have any information from the user 202 indicating that the user 202 has finished speaking. The microphone of the computing device 206 remains active and may receive and process any additional sounds.

At stage D, the computing device 206 sends the next packet 220 of audio data 208 to the server 210. For example, the packet 220 of audio data 208 may include the next eight hundred milliseconds of audio data 208 following the packet 216. The packet 220 may correspond to the words "in California" followed by about one hundred milliseconds of silence. In the case where the user 202 finished speaking at time equals one thousand milliseconds, then the packet 220 may include additional silence (e.g., six hundred milliseconds).

The server 210 receives the packet 216 of the audio data and processes them using the speech decoder 222 and the end of query detector 224. The speech decoder may be configured to identify the different phonemes that are included in the portions of the audio data 208. In the example where the packet 216 includes the audio data corresponding to "what is the weather," the speech decoder 222 processes packet 216 and identifies the corresponding phonemes. The speech decoder 222 uses the language model 226 to generate a likely transcription of the packet 216. The speech decoder may not be as efficient processing the larger packet 216 instead of the smaller portions of audio data in FIG. 1. This slower processing may cause the speech decoder 222 to use more time to generate a transcription and determine when the user 202 has likely finished speaking.

The end of query detector 224 receives the packet 216 of the audio data 208 and applies the audio data to the trained end of query model 230. The end of query detector 224 generates a confidence score the reflects a likelihood that the user 202 has finished speaking. In other words, the confidence score reflects a probability that the utterance that corresponds to the packet 216 is complete. The end of query detector 224 compares the confidence score to a threshold score. If the confidence score satisfies a threshold, then the end of query detector 224 determines that the user 202 has likely finished speaking.

As an example, the end of query detector 224 processes the packet 216 of the audio data 208 that may correspond to the user 202 speaking "what is the weather." The packet 216 may include some additional silence or may not include all of the "weather" speech. The end of query detector 224 processes the packet 216 using the trained end of query model 230. The end of query detector 224 generates a confidence score of 0.4 and compares the confidence score to a confidence threshold of 0.8. The end of query detector 224 determines that after the portion 216, the utterance is likely incomplete and the user 202 has not finished speaking.

Unlike the speech decoder 222, the end of query detector 224 is able to quickly process the packet 216 even though the packet 216 includes more audio data than the portions 116, 118, and 120 in FIG. 1. Accordingly, the end of query detector 224 is able to determine whether the utterance that corresponds to packet 216 is likely complete faster than the speech decoder 222 is able.

At stage E, the end of query detector 224 processes the packet 222 by applying the trained end of query model 230 to the packet 222 and the packet 216. Because the processing performed by the end of query detector 224 is fast, the end of query detector 224 is able to quickly calculate a confidence score that reflects a likelihood that the utterance that corresponds to packets 216 and 222 is complete. In this example, the end of query detector 224 may calculate that the confidence score is 0.9. The end of query detector 224 compare the confidence score to the confidence threshold of 0.8 and determines that utterance is likely complete. At time equals seventeen hundred milliseconds, the end of query detector 224 outputs an instruction to endpoint the utterance 204 at time equals eighteen hundred milliseconds.

At stage G, the speech decoder 222 processes the packet 220 of the audio data 208. As noted above, the speech decoder 222 may not be able to process the large packet 220 at the same speed as the smaller portions of the audio data 108 shown in FIG. 1. The speech decoder 222 uses the language model 226 to process the packet 220 and the packet 216. The speech decoder 222 is unable to determine whether the utterance that corresponds to packets 216 and 220 is likely complete as quickly as the end of query detector 224. For example, at time equals seventeen hundred fifty milliseconds, the output 232 does not indicate whether the utterance 208 is likely complete. The end of query detector 224 is able to output an end of utterance decision more quickly than the speech decoder 222 in instances where the server 210 receives audio data in large packets, which may be caused by a slow network connection.

To preserve the user experience and prevent the microphone of the computing device 206 from remaining active longer than necessary, the server 210, at stage F, may transmit an instruction 212 for the computing device 206 to close the microphone at time equals eighteen hundred milliseconds. This can avoid the unnecessary use of computational resources and preserve the user experience by preventing the detection and implementation of additional detected audio. Even with a slower network 214, the computing device 206 is able to receive a timely instruction 212 regarding deactivation of the microphone and deactivate the microphone in response to the instruction 212.

The speech decoder 222 continues to process the packets 216 and 222 of the audio data 208. The speech decoder 222 applies the language model 226 to the packets 216 and 222 and generates the transcription 228. At stage H, the server 210 outputs the transcription 228 of the utterance 204. In some implementations, the server 210 may transmit the transcription 228 to the computing device 206. In this instance, the computing device 202 may display the transcription on the 228 on the display of the computing device 202. In some implementations, the server 210 may perform an action based on the transcription 228 such as initiate a phone call, send a message, open an application, initiate a search query, or any other similar action.

Figure 3:
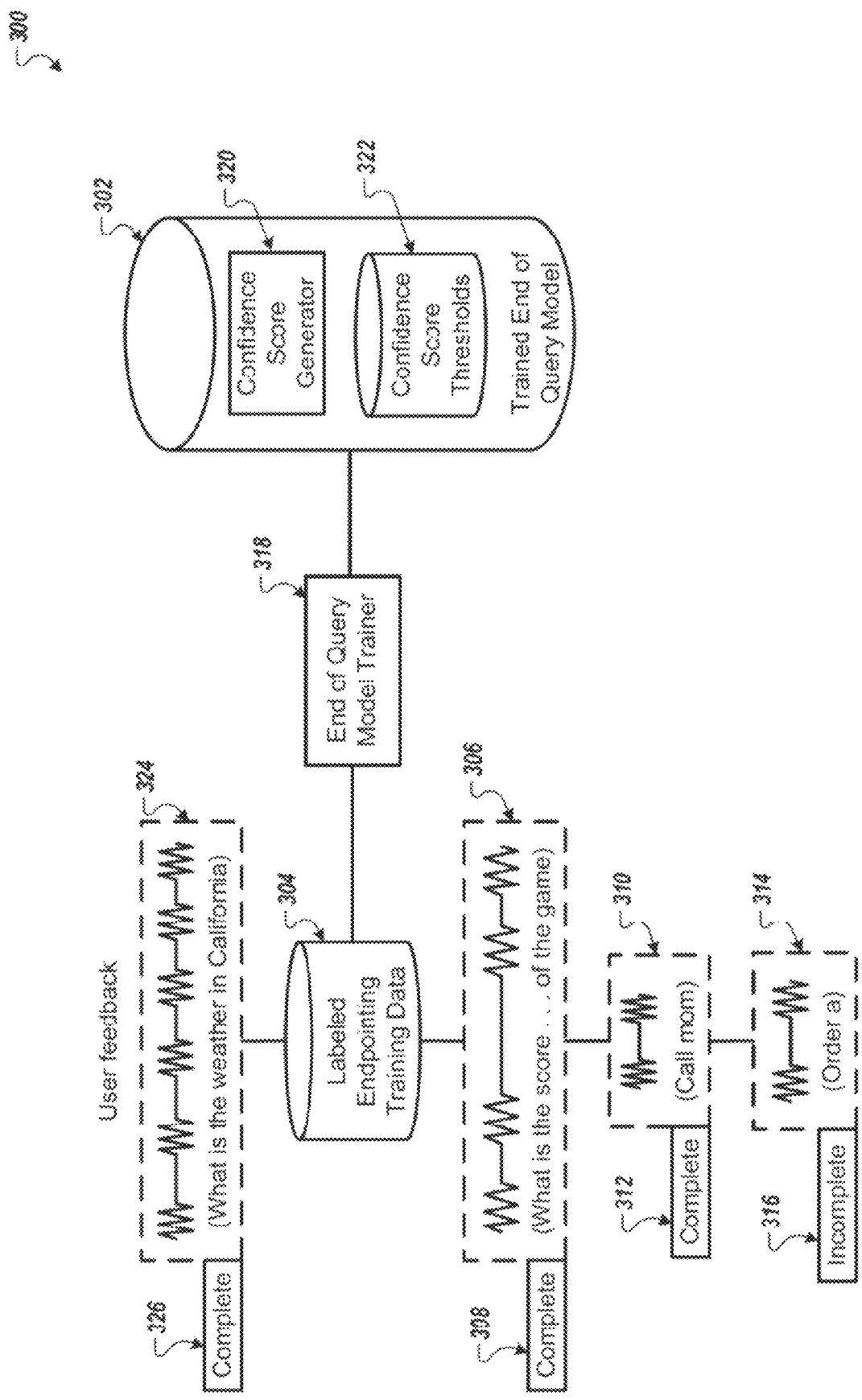
FIG. 3 illustrates an example system for training an end of utterance detector.

FIG. 3 illustrates an example system 300 for training an end of query model 302. Briefly, and as described in more detail below, the system 300 uses labeled endpointing training data 304 to train the end of query model 302. The trained end of query model 302 is capable of determining whether an utterance is likely complete. The end of query model 302 may be similar to the end of query model 130 of FIG. 1 and the end of query model 230 of FIG. 2.

The system 300 includes labeled endpointing training data 304. The labeled endpointing training data 304 includes multiple audio samples that include both complete utterances and incomplete utterances. Each audio sample includes a label indicating whether it is complete or incomplete. For example, the labeled endpointing training data 304 includes audio data 306 that corresponds to the utterance "what is the score . . . of the game." The audio data 306 includes a label 308 indicating that the audio data 306 represents a complete utterance. The labeled endpointing training data 304 includes audio data 310 that corresponds to the utterance "call mom." The audio data 310 includes a label 312 indicating that the audio data 308 represents a complete utterance. The labeled endpointing training data 304 includes audio data 314 that corresponds to the utterance "order a." The audio data 314 includes a label 316 indicating that the audio data 314 represents an incomplete utterance.

In some implementations, the labeled endpointing training data 304 may be specific for a user, a type of user, an environment, a particular device, or any other type of variable. For example, the labeled endpointing training data 304 may only include audio samples from user 102 in FIG. 1. As another example, the labeled endpointing training data 304 may only include audio samples collected on a particular device, such as a particular model of phone. As another example, the labeled endpointing training data 304 may only include audio samples from users who are driving in a car while speaking.

The system 300 includes an end of query model trainer 318. The end of query model trainer 318 uses machine learning to train the end of query model 302. The end of query model 302 may be a neural network trained by the end of model trainer. In some implementations, the neural network is a recurrent neural network or a convolutional neural network. The neural network may have a specified number of hidden layers or be a unidirectional LSTM-based network.

The trained end of query model 302 includes a confidence score generator 320 that generates a confidence score that indicates a likelihood that the received audio data corresponds to a complete utterance. The trained end of query model 302 compares the generated confidence score to a confidence score threshold stored in the confidence score thresholds 322.

The trained end of query model 302 is configured to generate a confidence score for the received audio data sample and for each subsequent portion of the audio data sample. The subsequently generated confidence scores are not only based on the initial portion of the audio data sample, but also on each subsequent portion of the audio data sample. Following the example from FIG. 1, the trained end of query model 302 may generate a confidence score based on the portion 116 of the audio data 108. The trained end of query model 302 may receive the portion 118 of the audio data 108 and generate another confidence score based on both the portions 116 and 118. Upon receiving the portion 120 of the audio data 108, the trained end of query model 302 may generate another confidence score based on the portions 116, 118, and 120. In other words, the trained end of query model 302 uses all the data received for a particular utterance to determine whether the utterance is likely complete.

In some implementations, the end of query model 302 may factor in various audio speech characteristics to determine the confidence score. For example, the end of query model 302 may use pitch, loudness, intonation, sharpness, articulation, roughness, instability, and speech rate or any combination of these characteristics. Use of these characteristics can provide an improved end of query model as compared to conventional approaches which consider only whether a fixed interval of silence is detected after a user utterance. The end of query model 302 may generate a lower confidence score in instances where the user is speaking slowly. For example, if the user speaks "what is the weather" and stretches the pronunciation of "weather" to indicate that that the user is not finished speaking, then the end of query model 302 may use that speech characteristic as well as other speech characteristics to generate a confidence score. This can improve the utility of the model for users with speech impediments, for example. The audio speech characteristics used by the end of query model 302 may depend on the labeled endpointing training data 304.

In some implementations, the confidence score thresholds 322 may include different confidence score thresholds for different environmental conditions. For example, the confidence score thresholds 322 may be different for road noise (e.g., driving in a car), background conversation (e.g., a bar or restaurant), or minimal background noise (e.g., an office environment).

In some implementations, the system 300 receives additional labeled endpointing training data 304. The additional labeled endpointing training data 304 may be from user feedback. For example, a user may indicate that the user did not finish speaking before the computing device deactivated the microphone and processes the user's query. As another example, the user may indicate that the computing device captured the entire user's utterance. The user feedback audio sample may be added to the labeled endpointing training data 304 for the end of query model trainer 318 to update the trained end of query model 302. In the example, shown in FIG. 3, the user confirms that the user said "what is the weather in California." The system 300 may add the corresponding audio data 324 and the complete label 326 to the labeled endpointing training data 304.

Figure 4:
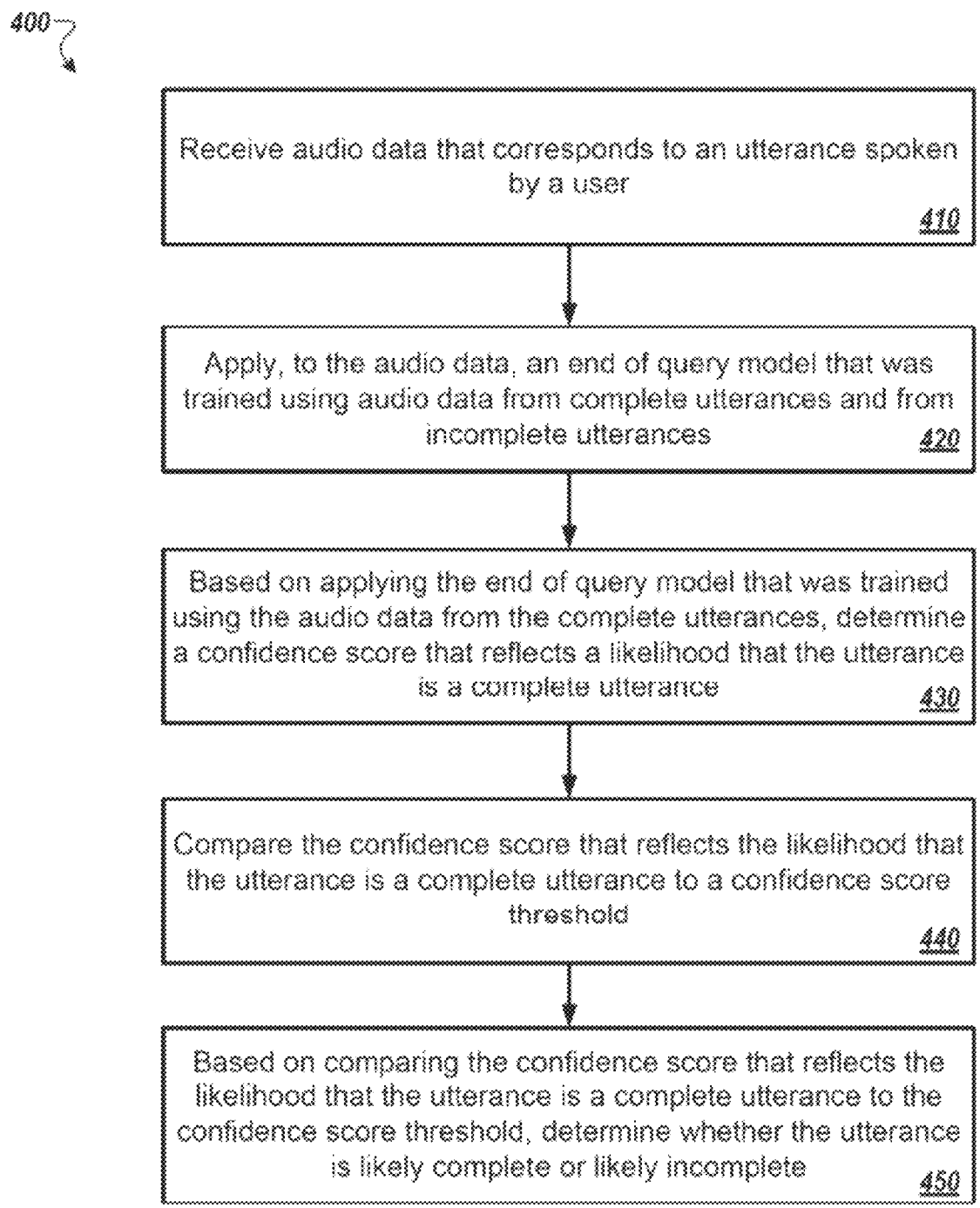
FIG. 4 illustrates an example process for detecting an end of query model.

FIG. 4 illustrates an example process 400 for detecting an end of an utterance. In general, the process 400 receives audio data of an utterance spoken by a user. The process 400 determines a point at which the user has likely finished speaking and deactivates the microphone. The process 400 will be described as being performed by a computer system comprising one or more computers, for example, the system 100 as shown in FIG. 1 or the system 200 as shown in FIG. 2.

The system receives audio data that corresponds to an utterance spoken by a user (410). For example, the user may speak into a microphone of a mobile phone and begin saying, "Order a large cheese pizza." The mobile phone may begin to generate audio data corresponding to the utterance and transmit portions of the audio data as the mobile phone receives the utterance. The size and frequency of transmission of the portions of the audio data may be related to the speed of the network connection between the mobile phone and the system. A slower network connection may cause the mobile phone to transmit larger portions of the audio data less frequently than a faster network connection.

The system applies, to the audio data, an end of query model that was trained using audio data from complete utterances and from incomplete utterances (420). For example, the system receives the portions of the audio data corresponding to "order a large cheese pizza." As the system receives an initial portion of the audio data, the system applies the end of query model to the initial portion of the audio data. The system continues to apply the end of query model to subsequent portions of the audio data. In some implementations, the system receives audio data samples that include multiple complete utterances and multiple incomplete utterances. The system trains, using machine learning, the end of query model using the audio data of the multiple complete utterances and the multiple incomplete utterances. This training may occur prior to receiving audio data of a user's utterance. The end of query model may be based on a neural network and configured to determine whether an utterance is likely complete by analyzing the acoustic speech characteristics such as pitch, loudness, intonation, sharpness, articulation, roughness, instability, and speech rate. The acoustic speech characteristics used by the end of query model may depend on the audio samples used to train the end of query model.

The system, based on applying the end of query model that was trained using the audio data from the complete utterances and from the incomplete utterances, determines a confidence score that reflects a likelihood that the utterance is a complete utterance (430). For example, the system generates a confidence score, also known as a posterior, based on an initial portion of the audio data corresponding to "order a large cheese pizza." As the system receives subsequent portions of the audio data, the system applies the initial and subsequent portions to the end of query model and generates a confidence score. For example, after receiving the audio data corresponding to "order a." the confidence score may be 0.1. After receiving the audio data corresponding to "large cheese pizza," the confidence score may be 0.9.

The system compares the confidence score that reflects the likelihood that the utterance is a complete utterance to a confidence score threshold (440). For example, the system compares the confidence score of 0.1 to the confidence score threshold of 0.8 or the confidence score of 0.9 to the confidence score threshold of 0.8. The confidence score threshold may vary depending on the environment where the user is speaking. For example, a noisy environment such as a moving car, may have a lower confidence score threshold than a quiet environment such as an office.

The system, based on comparing the confidence score that reflects the likelihood that the utterance is a complete utterance to the confidence score threshold, determines whether the utterance is likely complete or likely incomplete (450). For example, the confidence score of 0.1 may indicate that the utterance is likely incomplete, and the confidence score of 0.9 may indicate that the utterance is likely complete. While the confidence score is lower than the confidence score threshold, the system may instruct the mobile phone to maintain the microphone in an active state to ensure that additional speech is detected. If the confidence score is equal to or greater than the confidence score threshold, the system may instruct the mobile phone to deactivate the microphone to ensure that additional audio is not detected. In some implementations, the mobile phone may leave the microphone on absent an instruction to deactivate the microphone.

The system may generate a transcription of the audio data. For example, the system may generate the text "order a large cheese pizza." The system may output the transcription to the mobile phone or to another computing device. The system may execute an action based on the transcription. For example, the system may order a large cheese pizza for the user.

In some implementations, the system may receive confirmation from the user that the transcription and, thus, the endpointing of the utterance was correct. For example, the system may instruct the mobile phone to display a confirmation for the order of a large cheese pizza. If the user confirms the order, then the system may use the audio data of the corresponding utterance, label the audio data as complete, and update the end of query model. If the mobile phone presents an option that does not include all of what the user said, then the user dismiss the option and repeat the utterance. For example, the user may say, "Text mom, I'll be home soon." If the system deactivates the microphone after "home" and before "soon" and presented the option to text "I'll be home," then the user may dismiss the option. The system may use the audio data that corresponds to "text mom, I'll be home," to label the audio data as incomplete, and update the end of query model. Through this dynamic updating, an improved learning process for the end of query model can be provided.

In some implementations, the system includes a speech decoder that is configured to generate a transcription of the audio data and determine when the user has likely finished speaking. The speech decoder or another part of the system may convert the received audio data into phonemes. The speech decoder may use a language model to generate a transcription of the audio data and determine when the user has likely finished speaking.

In instances where the speech decoder and the end of query model determine at approximately the same time whether the user has likely finished speaking, then the system may use both determinations to generate an instruction to close the microphone. If the endpointing determinations of the speech decoder and the end of query model do not match, then the system may select the decision that surpasses the corresponding threshold by a greater amount or a greater relative amount.

In instances where the end of query model determines that the user has likely finished speaking before the speech decoder, then the system may generate an instruction to close the microphone based on the end of query model determination. This may occur when the network connection between the mobile phone and the system is slower.

In some implementations, the system may determine a speed of the network connection between the system and the client device. The system may use the speed of the network as a factor in determining whether to endpoint the utterance based on the speech decoder or the end of query model. If the network speed is, for example, one hundred kilobits per second, then the system may endpoint the utterance once end of query model generates an endpointing decision. If the network speed is, for example, fifty megabits per second, then the system may wait for the speech decoder to generate an endpointing decision. In some implementations, the system may wait a maximum amount of time after the end of query model generates an endpointing decision before endpointing the utterance. For example, the maximum amount of time may be ten milliseconds. The system may determine the maximum amount of time such that the user experience remains the same during a slow network connection when the speech decoder may be delayed.

In additional detail and in some streaming speech recognition applications such as voice search, it is helpful to determine quickly and accurately when the user has finished speaking their query. In some implementations, a speech recognition application may declare an end-of-query whenever a fixed interval of silence is detected by a voice activity detector (VAD) trained to classify each frame as speech or silence. Silence detection and end-of-query detection are considered different tasks, and the criterion used during VAD training may not be optimal. In some implementations, the silence detection approach may ignore potential acoustic cues such as filler sounds and past speaking rate which may indicate whether a given pause is temporary or query-final. This disclosure presents a modification to make the silence detection VAD training criterion more closely related to end-of-query detection. A unidirectional long short-term memory architecture allows the system to remember past acoustic events, and the training criterion incentivizes the system to learn to use any acoustic cues relevant to predicting future user intent. As discussed below, this approach improves latency at a given accuracy for end-of-query detection for voice search.

In some streaming speech recognition applications such as voice search and dialogue systems it may be helpful to determine quickly and accurately when the user of a system has finished speaking. This task is performed by an end-pointer, which may be referred to as a microphone closer or end-of-query detector. The microphone closer or end-of-query detector identifies when a user is likely finished speaking and deactivates the microphone at that point. The system receives a stream of audio and makes a series of binary decisions- to wait for further speech, or to stop listening and submit the audio so far received for subsequent processing. Each of these microphone close or stopping decisions is irrevocable and based only on the audio so far received. In some implementations, it may be desirable to have small latency, defined as the time between the user finishing speaking and the system closing the microphone, and not to cut-off the user, defined as the system closing the microphone before the user has finished speaking. There may be a natural tension between these two goals. Microphone closer performance can strongly affect users' perception of a system. For example, microphone closer performance is critical to natural turn-taking in dialogue systems and bad microphone closer performance has been blamed for low user satisfaction. A longer latency can also increase the amount of power used by the computing device in operating the microphone and interpreting unrelated background audio, for example, which can affect battery lifetime.

Voice activity detection (VAD), also sometimes known as endpointing, may be the task of classifying each frame of audio as either speech or silence (non-speech). In an offline setting where all the audio is available to the system when making all decisions, VAD) and microphone closing may effectively be the same task, since the end of the last segment of speech is the end of the user's query. However, in an online or streaming setting where the classification of each frame is based solely on previous audio, microphone closing may be more difficult: a VAD system need only detect any current silence, whereas a microphone closer may predict whether there will be subsequent speech.

One approach to microphone closing is to declare end-of-query (EOQ) as soon as a VAD system observes speech followed by a fixed interval of silence. In some implementations, the VAD system is obtained by thresholding the posteriors from a probabilistic voice activity classifier. It seems likely that human listeners use additional acoustic cues such as filler sounds, speaking rhythm or fundamental frequency to inform their view of whether a human talker intends to continue speaking after a given pause. These end-of-query acoustic cues are ignored by VAD-based microphone closers.

In some implementations, a system may use a probabilistic end-of-query classifier as the basis for microphone closing. The classifier is trained to predict whether or not the user has finished speaking at a given time, and uses a unidirectional LSTM-based architecture to allow its predictions to be informed by past acoustic events. The LSTM and a modified loss function are complementary, and the combination offers the potential to automate learning of cues such as filler sounds and past speaking rate which may be temporally isolated from the frames where they are most useful for EOQ prediction and which would be hard to pick up on with simpler models.

In some implementations, a system may improve microphone closer performance by improving the accuracy of the voice activity detector, improving the estimate of the duration of current silence, or a variety of attempts to go beyond VAD-based microphone closing and take end-of-query (sometimes called end-of-utterance) into account. In some implementations, a system performing end of query detection may benefit from the EOQ-informative acoustic and decoder features used. The system may extract better EOQ-related information from existing acoustic features by using sequential models such as LSTMs.

Below includes a description for training a voice activity classifier and using it for microphone closing, training an end-of-query classifier and using that for microphone closing, a discussion of the metrics relevant to evaluating a microphone closer.

Voice activity (VAD-style) classifier-based microphone closing.

Figure 5:
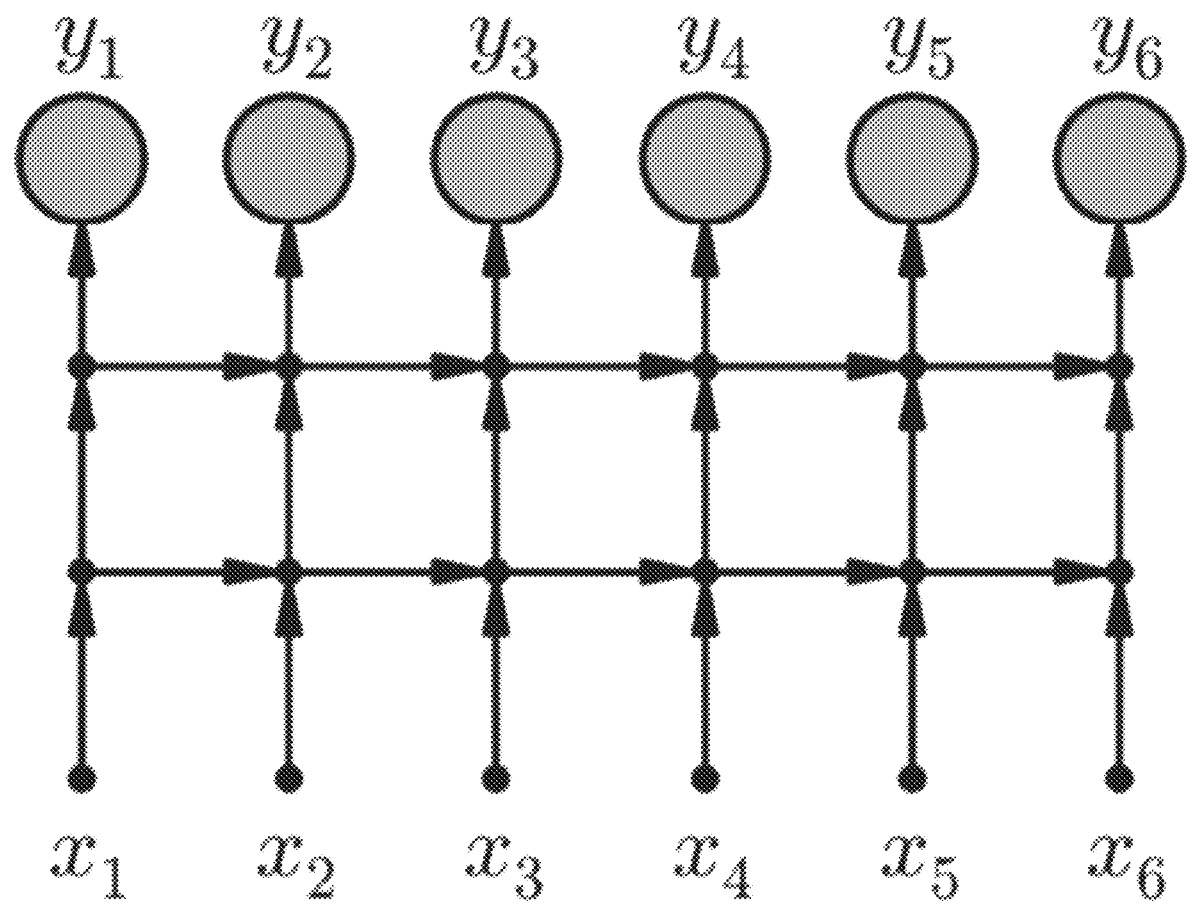
FIG. 5 illustrates a directed graphical model showing the computational and conditional independence structure of an example LSTM-based classifier.

In some implementations, a system may perform microphone closing based on training an online or streaming probabilistic voice activity classifier. A conditional probabilistic model $P(y|x, \lambda)$ used during training specifies the probability of a sequence $y=[y_t]$ (t=1 to T) of speech/silence labels given an acoustic feature vector sequence and model parameters $\lambda$. In some implementations, the labels y1, y2, . . . at different times are conditionally independent, even though this is may not be true. The probability $P(y_t|x, \lambda)$, often called the "posterior", is given by the output of a neural net which takes the acoustic feature vector sequence as input. The system uses a recurrent architecture including one or more long short-term memory (LSTM) layers to remember past acoustic information relevant to predicting whether the current frame is speech or silence. The recurrent layers are unidirectional to allow the overall system to operate in a streaming fashion. The final layer is a 2-class softmax layer which outputs framewise speech and silence posteriors. A directed graphical model showing the model structure is shown in FIG. 5. In FIG. 5, solid nodes are deterministic given their parents whereas circular nodes are stochastic, and observed nodes are shaded. In FIG. 5, xt is an acoustic feature vector and yt is a binary label. For some voice activity classifiers yt is speech or silence, whereas for the proposed end-of-query classifier yt is query-not-complete or query-complete. The probabilistic model may be trained using maximum likelihood (i.e. cross-entropy). The reference speech/silence label sequence used for training may be obtained by forced alignment of a human reference transcript, labeling all non-silence phonemes as speech. For concreteness, the system may use 1 for a speech label and 0 for silence.

To use the trained probabilistic voice activity classifier for microphone closing, the framewise posteriors are compared to a threshold to obtain hard speech/silence decisions, and the microphone is closed as soon as the system observes some speech followed by a fixed time interval of silence.

The above training procedure may incentivize the system to detect the acoustic cues which distinguish present speech from present silence, but may disregard cues which may help to predict whether a current silence will be followed by subsequent speech. As such, the above approach may result in utterances being considered complete when they are actually incomplete.

End-of-Query (EOQ) Classifier-Based Microphone Closing

In some implementations of the end of query model described herein, a system may perform microphone closing based on training a probabilistic end-of-query classifier to directly predict whether or not the user has finished speaking at a given time.

The probabilistic model $P(y|x, \lambda)$ may have the same structure described above but use different labels during training; the labels are now query-not-complete (label 1) or query-complete (label 0). The reference label sequence used during training may consist of a sequence of 1s followed by a sequence of 0s, with the first 0 occurring at the time of the ideal microphone close when the user has just finished speaking. An example of these VAD-style and EOQ-style label sequences is shown in Table 1.

TABLE 1

Example of the difference between VAD-style (silence is 0 and speech is 1) and EOQ-style (query-complete is 0 and query-not-complete is 1) targets used during classifier training for an utterance with 10 frames where the user finishes speaking at frame 8.

| frame | 0 | 1 | 2 | 3 | 4 | 5 | 6 | 7 | 8 | 9 |
|---|---|---|---|---|---|---|---|---|---|---|
| VAD-style | 0 | 0 | 1 | 1 | 1 | 0 | 1 | 1 | 0 | 0 |
| EOQ-style | 1 | 1 | 1 | 1 | 1 | 1 | 1 | 1 | 0 | 0 |

To use the trained probabilistic end-of-query classifier for microphone closing, the framewise posteriors are compared to a threshold to obtain hard end-of-query decisions, and the microphone is closed as soon as the system first outputs a query-complete label 0. The hard thresholding is a heuristic procedure and in some implementations may be suboptimal in terms of "maximizing utility". Hard thresholding can also provide a simple and effective approach, thereby reducing the computational resources used.

This change in training data may incentivize the system to detect any acoustic cues which help indicate whether the user intends to utter more speech. For example, if a user says "um" during a longish pause, the end-of-query classifier has the power (due to the LSTM) and inclination (due to the modified loss function) to remember that acoustic event and decrease the probability of query-complete in subsequent silence frames.

Figure 6:
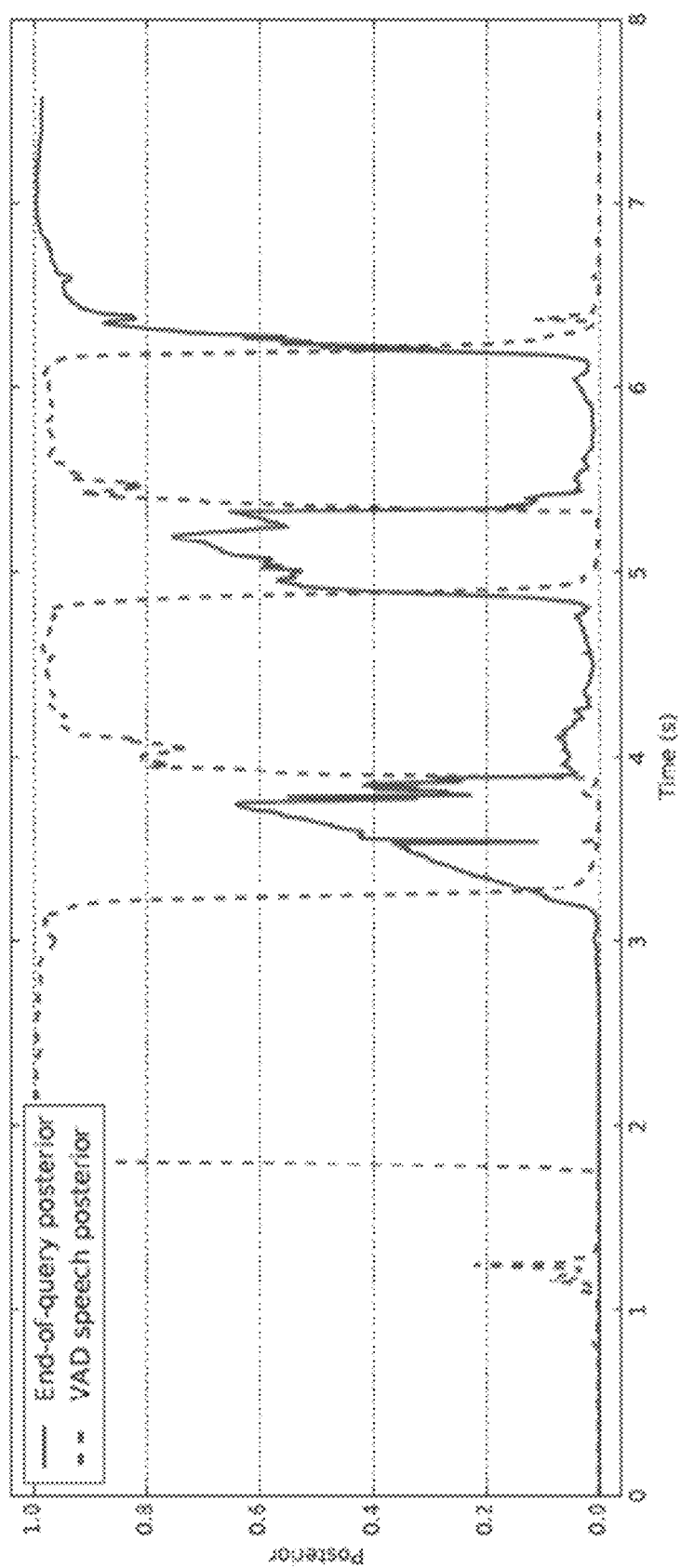
FIG. 6 illustrates example posteriors for a trained voice activity classifier and end-of-query classifier for a single utterance.

The posteriors, or probabilities, for a sample utterance are shown in FIG. 6. It can be seen that the belief of the end-of-query classifier in 'query-complete' (for example, the likelihood that the utterance is complete) grows during periods of non-initial silence, but that the rate may not be linear: in the first pause shown the system is relatively uncertain of end-of-utterance and the posterior grows slowly, for example. The difference the training criterion makes can also be seen in the fact that the voice activity (or VAD) classifier treats the silences near the start and end of the utterance in the same way, whereas the end-of-query classifier treats them very differently.

Microphone Closer Metrics

In some implementations, a system may use a set of four metrics to give insight into microphone closer performance. The metrics are summarized in Table 2. Word error rate may be the primary metric of speech recognition accuracy. It is affected by the microphone closer, since a cutoff often cuts off many words. EP cutoff is the proportion of utterances where the user is cutoff, e.g., the system closes the microphone before the user has finished speaking their query. This may be a helpful quantity to measure since being cutoff is a negative user experience and, in applications such as voice search, may require repeating the entire query. Together WER and EP cutoff measure the accuracy of a microphone closer. EP50 is the median latency over all or nearly all utterances. This may provide an idea of the typical user experience when using the system. EP90 is the 90th percentile latency over all utterances. This tail latency provides an idea of how bad the user experience is when the system is slow to close the microphone. Together EP50 and EP90 measure the speed of a microphone closer. For EP cutoff, EP50 and EP90, forced alignment of a reference transcript is used to determine when the user finished speaking

TABLE 2

Metrics used to evaluate microphone closer performance.

| WER | Word error rate |
|---|---|
| EP cutoff | Proportion of utterances with negative latency |
| EP50 | Median latency over all utterances |
| EP90 | 90$^{th}$ percentile latency over all utterances |

In some implementations, metrics used to evaluate a voice activity detector such as false alarm rate and false reject rate or precision and recall may not be very useful for evaluating the performance of a microphone closer as described herein.

Figure 7:
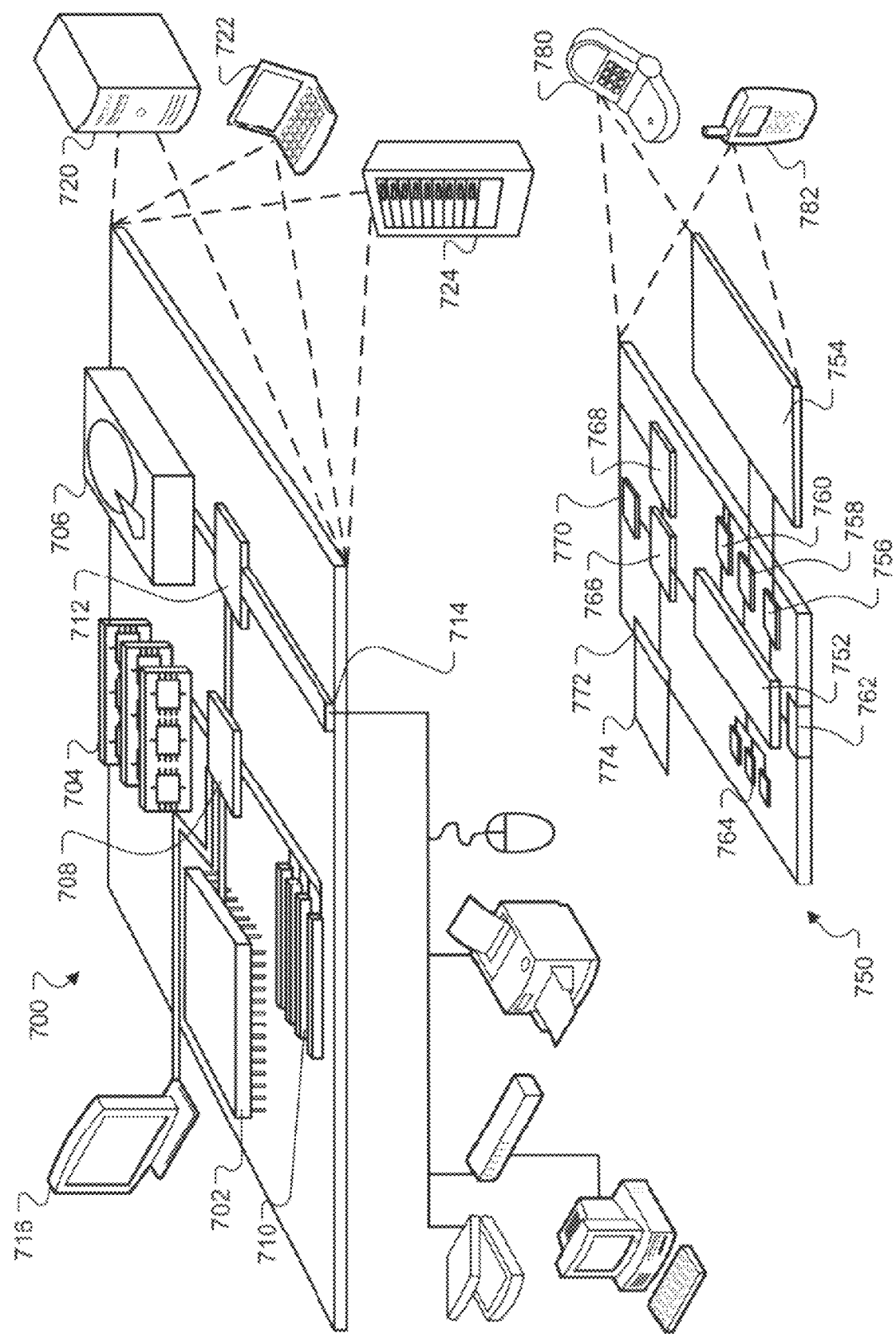
FIG. 7 illustrates an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards. In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provided as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications). SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver. In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
   receiving, at data processing hardware, audio data corresponding to an utterance spoken by a user;
   detecting, by the data processing hardware, from the audio data, acoustic speech characteristics of the utterance, the detected acoustic speech characteristics comprising pitch and speech rate;
   determining, by the data processing hardware, using an end of query model, a confidence score for the utterance based on the acoustic speech characteristics of the utterance, the confidence score indicating a likelihood that the utterance is a complete utterance, and the end of query model comprising a recurrent neural network having one or more long-short-term-memory (LSTM) layers;
   determining, by the data processing hardware, whether the confidence score for the utterance satisfies a confidence score threshold; and
   when the confidence score for the utterance satisfies the confidence score threshold:
      determining, by the data processing hardware, that the utterance is likely complete; and
      instructing, by the data processing hardware, deactivation of a microphone that is detecting the utterance.

2. The method of claim 1, further comprising, when the confidence score for the utterance does not satisfy the confidence score threshold:
   determining, by the data processing hardware, that the utterance is likely incomplete; and
   instructing, by the data processing hardware, the microphone that is detecting the utterance to maintain in an active state.

3. The method of claim 1, wherein the end of query model is trained on a plurality of training utterances, each training utterance of the plurality of training utterances comprising a sequence of time-based binary labels each indicating whether the corresponding training utterance is one of complete or incomplete.

4. The method of claim 3, wherein the end of query model is further trained on acoustic speech characteristics associated with each training utterance of the plurality of training utterances.

5. The method of claim 4, wherein the acoustic speech characteristics associated with each training utterance include pitch, loudness, intonation, sharpness, articulation, roughness, instability, and speech rate.

6. The method of claim 1, wherein:
   detecting, from the audio data, acoustic speech characteristics of the utterance comprises detecting corresponding acoustic speech characteristics of the utterance from each of a plurality of portions of the audio data;
determining, using the end of query model, the confidence score for the utterance based on the acoustic speech characteristics of the utterance comprises determining, for each of the plurality of portions of the audio data, a corresponding confidence score of the utterance based on the corresponding acoustic speech characteristics of the utterance detected from each preceding portion of the audio data; and
determining whether the confidence score for the utterance satisfies a confidence score threshold comprises determining whether the corresponding confidence score of the utterance for each of the plurality of portions of the audio data satisfies the confidence threshold.

7. The method of claim 1, further comprising, when the confidence score for the utterance satisfies the confidence score threshold:
determining, by the data processing hardware, that a speech decoder configured to generate a transcription of the audio data and determine whether the utterance is likely complete or likely incomplete has not determined whether the utterance is likely complete or likely incomplete,
wherein determining that the utterance is likely complete is based only on determining that the confidence score for the utterance satisfies the confidence score threshold.

8. The method of claim 7, wherein the speech decoder uses a language model to determine whether the utterance is likely complete or likely incomplete.

9. The method of claim 1, further comprising, when the confidence score for the utterance satisfies the confidence score threshold:
determining, by the data processing hardware, that a speech decoder configured to generate a transcription of the audio data and determine whether the utterance is likely complete or likely incomplete has determined whether the utterance is likely complete or likely incomplete,
wherein determining that the utterance is likely complete is based on:
determining that the confidence score for the utterance satisfies the confidence score threshold; and
the speech decoder determining whether the utterance is likely complete or likely incomplete.

10. The method of claim 1, wherein receiving the audio data corresponding to the utterance comprises receiving the audio data from a user device associated with the user and in communication with the data processing hardware via a network, the user device comprising the microphone that is detecting the utterance.

11. A system comprising:
data processing hardware; and
memory hardware in communication with the data processing hardware and storing instructions that when executed on the data processing hardware cause the data processing hardware to perform operations comprising:
receiving audio data corresponding to an utterance spoken by a user;
detecting, from the audio data, acoustic speech characteristics of the utterance, the detected acoustic speech characteristics comprising pitch and speech rate;
determining, using an end of query model, a confidence score for the utterance based on the acoustic speech characteristics of the utterance, the confidence score indicating a likelihood that the utterance is a complete utterance, and the end of query model comprising a recurrent neural network having one or more long-short-term-memory (LSTM) layers;
determining whether the confidence score for the utterance satisfies a confidence score threshold; and
when the confidence score for the utterance satisfies the confidence score threshold:
determining that the utterance is likely complete; and
instructing deactivation of a microphone that is detecting the utterance.

12. The system of claim 11, wherein the operations further comprise, when the confidence score for the utterance does not satisfy the confidence score threshold:
determining that the utterance is likely incomplete; and
instructing the microphone that is detecting the utterance to maintain in an active state.

13. The system of claim 11, wherein the end of query model is trained on a plurality of training utterances, each training utterance of the plurality of training utterances comprising a sequence of time-based binary labels each indicating whether the corresponding training utterance is one of complete or incomplete.

14. The system of claim 13, wherein the end of query model is further trained on acoustic speech characteristics associated with each training utterance of the plurality of training utterances.

15. The system of claim 14, wherein the acoustic speech characteristics associated with each training utterance include pitch, loudness, intonation, sharpness, articulation, roughness, instability, and speech rate.

16. The system of claim 11, wherein:
detecting, from the audio data, acoustic speech characteristics of the utterance comprises detecting corresponding acoustic speech characteristics of the utterance from each of a plurality of portions of the audio data;
determining, using the end of query model, the confidence score for the utterance based on the acoustic speech characteristics of the utterance comprises determining, for each of the plurality of portions of the audio data, a corresponding confidence score of the utterance based on the corresponding acoustic speech characteristics of the utterance detected from each preceding portion of the audio data; and
determining whether the confidence score for the utterance satisfies a confidence score threshold comprises determining whether the corresponding confidence score of the utterance for each of the plurality of portions of the audio data satisfies the confidence threshold.

17. The system of claim 11, wherein the operations further comprise, when the confidence score for the utterance satisfies the confidence score threshold:
determining that a speech decoder configured to generate a transcription of the audio data and determine whether the utterance is likely complete or likely incomplete has not determined whether the utterance is likely complete or likely incomplete,
wherein determining that the utterance is likely complete is based only on determining that the confidence score for the utterance satisfies the confidence score threshold.

18. The system of claim 17, wherein the speech decoder uses a language model to determine whether the utterance is likely complete or likely incomplete.

19. The system of claim 11, wherein the operations further comprise, when the confidence score for the utterance satisfies the confidence score threshold:
- determining that a speech decoder configured to generate a transcription of the audio data and determine whether the utterance is likely complete or likely incomplete has determined whether the utterance is likely complete or likely incomplete,
- wherein determining whether the utterance is likely complete is based on:
  - determining that the confidence score for the utterance satisfies the confidence score threshold; and
  - the speech decoder determining whether the utterance is likely complete or likely incomplete.

20. The system of claim 11, wherein receiving the audio data corresponding to the utterance comprises receiving the audio data from a user device associated with the user and in communication with the data processing hardware via a network, the user device comprising the microphone that is detecting the utterance.

\* \* \* \* \*